US005886855A

United States Patent [19]

Iwabuchi

[11] Patent Number: 5,886,855
[45] Date of Patent: Mar. 23, 1999

[54] SPINDLE STRUCTURE FOR MAGNETIC DISK DEVICE

[75] Inventor: Masanori Iwabuchi, Ibaraki, Japan

[73] Assignee: NEC Corporation, Tokyo, Japan

[21] Appl. No.: 882,260

[22] Filed: Jun. 25, 1997

[30] Foreign Application Priority Data

Jun. 26, 1996 [JP] Japan .................................... 8-165948

[51] Int. Cl.[6] ..................................................... G11B 17/02
[52] U.S. Cl. ........................................................... 360/99.08
[58] Field of Search .............................. 360/99.08, 99.04, 360/98.07

[56] References Cited

U.S. PATENT DOCUMENTS 5,485,331 1/1996 Dunfield et al. ..................... 360/99.08

FOREIGN PATENT DOCUMENTS 155459 6/1988 Japan .

*Primary Examiner*—Robert S.. Tupper
*Attorney, Agent, or Firm*—Sughrue, Mion, Zinn, Macpeak & Seas, PLLC

[57] ABSTRACT

The magnetic disk device spindle structure according to the present invention includes a hub on which is mounted a magnetic recording medium, a spindle shaft which is a fixed shaft, bearings which are secured to this spindle shaft and which rotatably support the hub, and finally, a film inserted at the contact surfaces of the hub and the bearings. In addition, a plurality of grooves for accommodating the film that are of a depth that is less than the thickness of the film may be provided in the contact surface of the hub that contacts the bearings.

2 Claims, 4 Drawing Sheets

8a
8b
6
7
11
3
10
9

SPINDLE STRUCTURE FOR MAGNETIC DISK DEVICE

BACKGROUND OF THE INVENTION

1. Field of the Invention

The present invention relates to a spindle structure for a magnetic disk device, and particularly to the structure of a spindle that prevents galling of the contact surface during insertion of bearings.

2. Description of the Related Art

As shown in FIG. 1, which shows the plan view of the construction of an ordinary magnetic disk device, the construction of magnetic disk device 1 includes motor (hereinbelow referred to as a "spindle motor") 13 that rotates magnetic recording medium 2 around the spindle shaft as the central axis, magnetic head 4 that is positioned against the magnetic recording medium 2 and that reads and writes data, and positioner 5 that has a magnetic head at one end, is equipped with a drive structure, and that effects positioning to a prescribed track of magnetic recording medium 2.

The structure of the spindle of the above-described magnetic disk device includes a spindle shaft, two bearings secured to the spindle shaft, and a rotating portion upon which the magnetic recording medium is mounted and which is rotatably supported by these bearings (hereinbelow referred to as the "hub"). These two bearings are generally used to receive between them the thrust load, called "preload," that is parallel to the longitudinal direction of the spindle shaft, and this thrust load eliminates "play" between the spindle shaft and the bearings to ensure smooth and stable rotation of the magnetic recording medium.

Moreover, when fabricating the spindle construction, the assembly of these bearings is demanded of extremely high accuracy. The accuracy of assembly of these bearings directly affects the accuracy of rotation of the magnetic recording medium and therefore has a great effect on the performance of the magnetic disk device. Either a bonding method or a press-fit method is employed to secure the bearings, and high accuracy is similarly demanded of the surface to which the bearings are secured.

FIG. 2 is a sectional view of an conventional spindle motor of the prior art. As shown in FIG. 2, this spindle motor 13 is made up of: spindle shaft 6 secured in a housing; hub 17 and permanent magnet 10 which constitute a rotor that holds magnetic recording medium 2 (refer to FIG. 1); two bearings 18*a* and 18*b* that are secured to spindle shaft 6 and that rotatably support hub 17; and stator 9 that includes a coil.

When fabricating the above-described spindle motor 13, bearings 18*a* and 18*b* are secured to hub 17 by a bonding method or by a press-fit method. This process, however, tends to cause "galling" of the contact surfaces of bearings 18*a* and 18*b* and hub 17, and this galling presents a great impediment to ensuring the accurate rotation of spindle motor 13.

Other spindle constructions have been disclosed for preventing galling (such as in Japanese Patent Laid-open No. 155459/88) in which the outer circumferences of the spindle bearings are in a tapered form and the bearing are held in bearing housings arranged at both ends of the shaft.

To prevent the above-described galling, no effective measures have been available other than improving the processing accuracy of the insertion surface or improving the accuracy of jigs used in assembly. These methods of the prior art have not always been effective, and defects have occurred in fabrication. As a result, the insertion and securing of bearings during assembly of the bearings requires extra care to prevent minute galling of the surfaces to which the bearings are secured, and this need for extra attention inevitably results in reducing the yield in manufacturing magnetic disk devices.

SUMMARY OF THE INVENTION

The object of the present invention is to provide a spindle structure of a magnetic disk device that, by preventing the occurrence of galling between the bearings and surfaces to which bearings are secured that occurs when inserting the bearings of the spindle motor used in a magnetic disk device, ensures accurate rotation of the hub, i.e., the magnetic recording medium, and increases the recording density of the magnetic disk device as well as the service life of the bearings.

The present invention is a spindle structure for a magnetic disk device that is made up of a hub on which is mounted a magnetic recording medium, a spindle shaft which is a fixed shaft, and bearings that are secured to this spindle shaft and which rotatably support the hub; wherein a film is applied to the contacting surfaces of the hub and the bearings. In addition, the contacting surface of the hub which contacts the bearings may have a plurality of grooves having a depth that is less than the thickness of the film and into which film in strip form is inserted. Finally, the film is preferably a synthetic resin.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
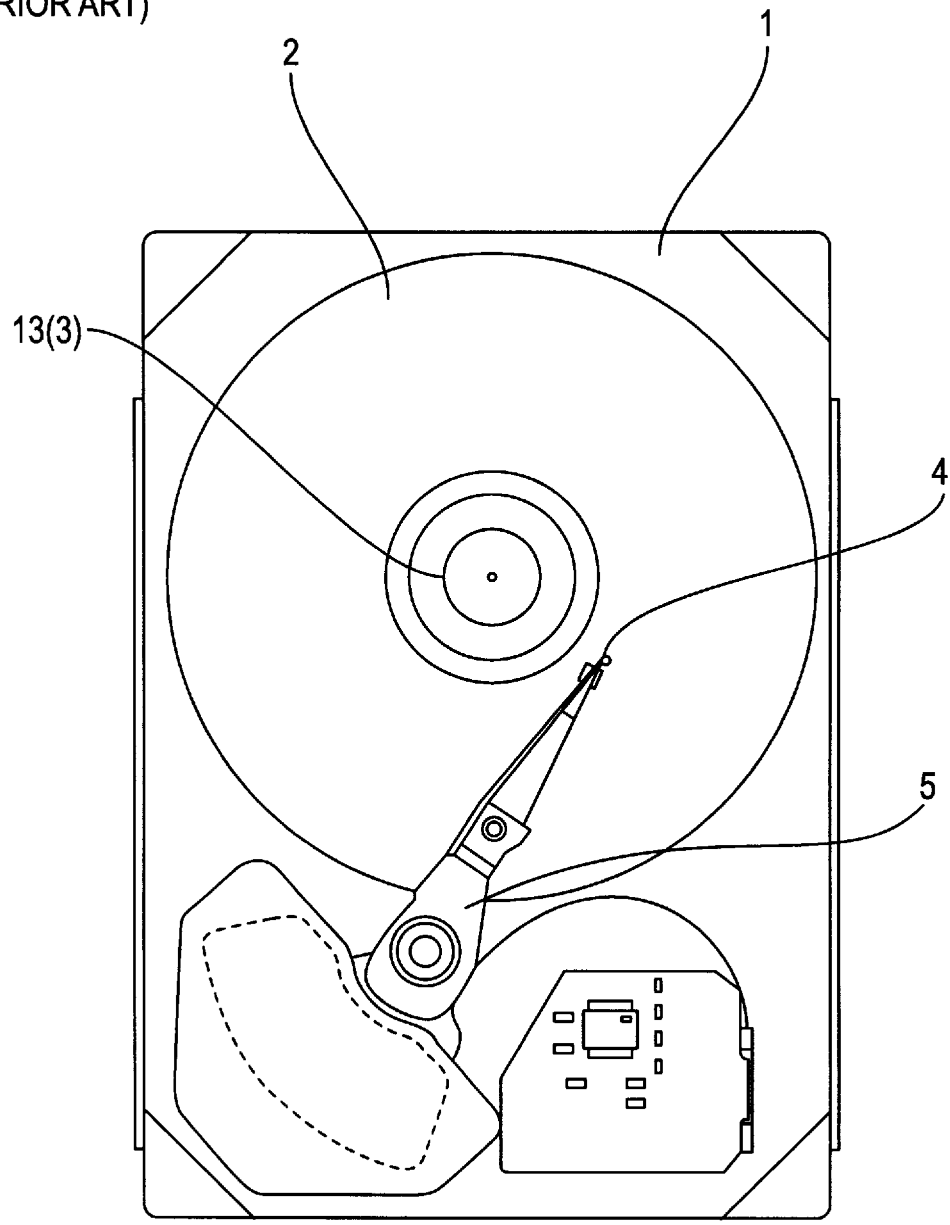
FIG. 1 is a plan view showing the construction of a conventional magnetic disk device.
Figure 2:
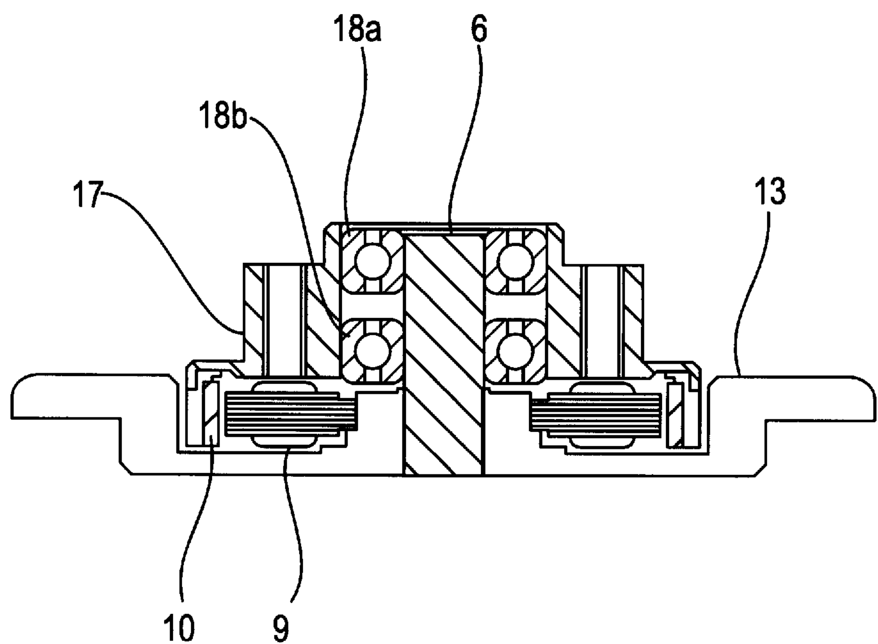
FIG. 2 is a vertical sectional view showing one example of the spindle structure of a magnetic disk device of the prior art.
Figure 3A:
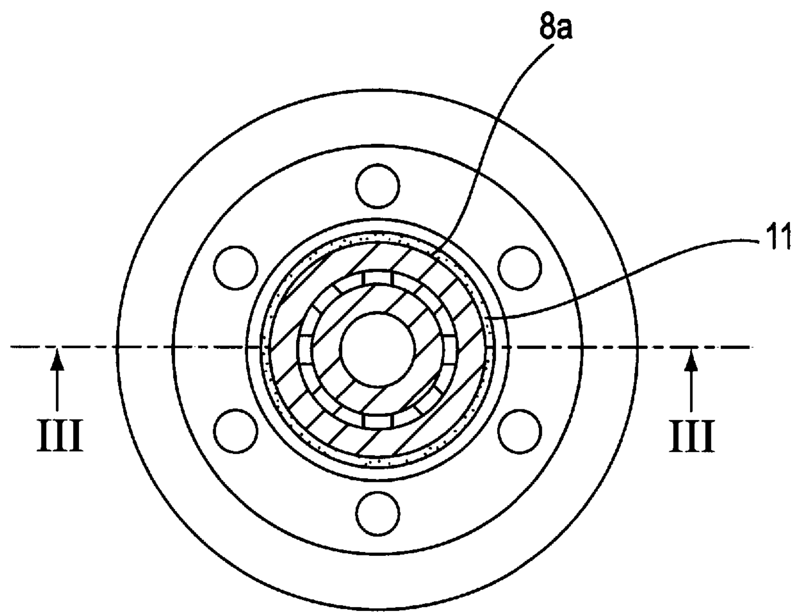
FIG. 3*a* is a plan view showing an embodiment of the present invention.
Figure 3B:
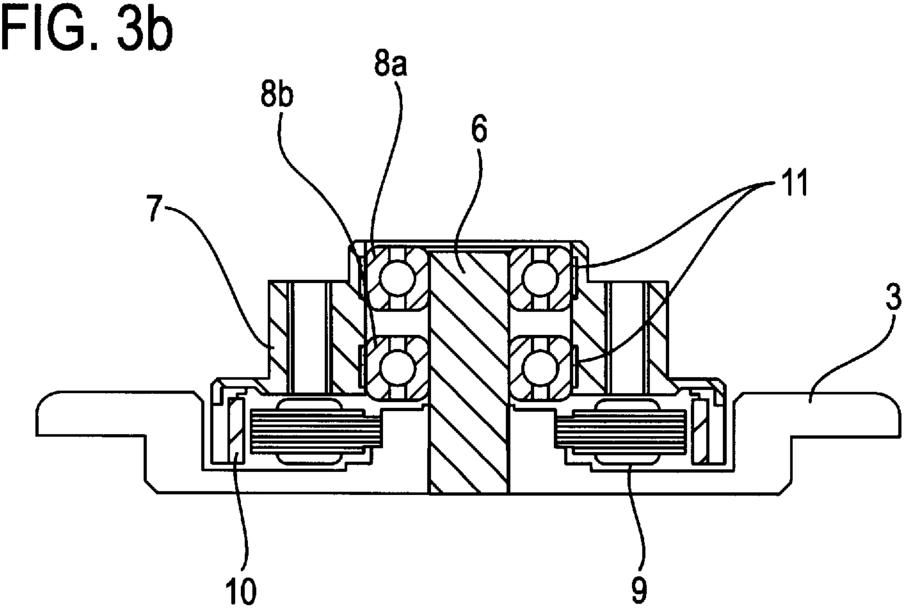
FIG. 3*b* is a sectional view taken along line III—III of FIG. 3*a*.

The present invention will next be described with reference to the accompanying figures. FIG. 3*a* and FIG. 3*b* show the construction of an embodiment of the present invention. As shown by FIGS. 3*a* and 3*b*, the basic composition of the magnetic disk device spindle structure according to the present invention is equivalent to the prior art example shown in FIG. 2, and spindle motor 3, which is the spindle structure, is made up of: spindle shaft 6, which is fixed in a housing; hub 7 and permanent magnet 10 which constitute a rotor, which support magnetic recording medium 2 (refer to FIG. 1); two bearings 8*a* and 8*b*, which are secured to spindle shaft 6 and which rotatably support hub 7; and stator 9, which includes a coil.

The construction of spindle motor 3 described above differs from that of the prior art in that it includes film 11 composed of, for example, a synthetic resin, that is interposed between hub 7 and bearings 8*a* and 8*b* and that surrounds the entire outer circumference of bearings 8*a* and 8*b*. An equivalent effect can be obtained if this film 11 is a resin film created by applying and baking a synthetic resin onto the insertion surface (contact surface) of hub 7 or bearings 8*a* and 8*b*.

Film 11 thus prevents the galling which tends to occur when inserting bearings 8*a* and B*b* into hub 7, and in addition, can absorb and ease dimensional variations arising during changes in temperature due to differences between the thermal expansion coefficients of hub 7 and bearings 8*a* and 8*b*.

Figure 4A:
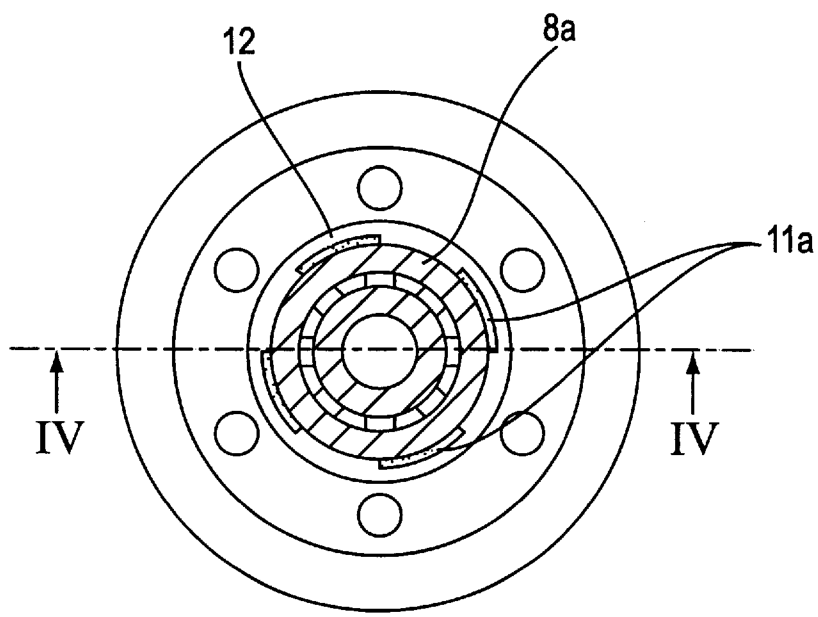
FIG. 4*a* is a plan view showing another embodiment of the present invention.
Figure 4B:
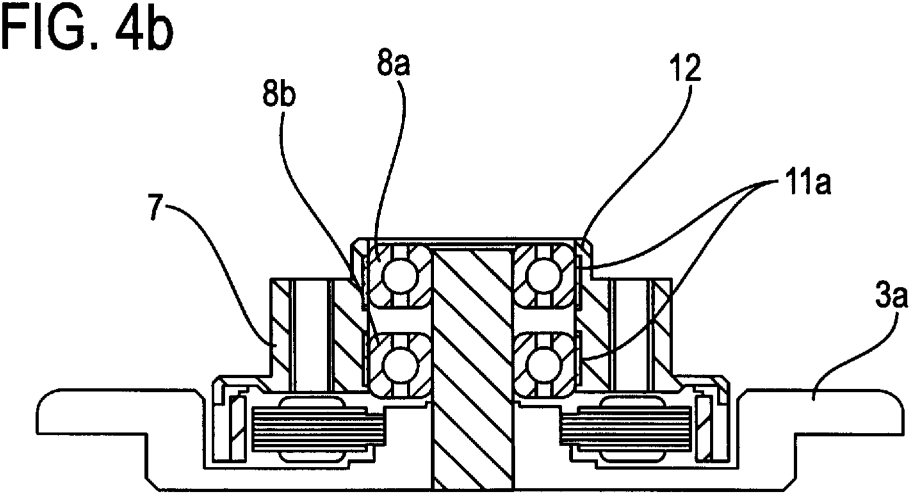
FIG. 4*b* is a sectional view taken along line IV—IV of FIG. 4*a*.

FIGS. 4*a* and 4*b* show the structure of another embodiment of the present invention. As shown in FIGS. 4*a* and 4*b*, the basic construction of spindle motor 3*a* is the same as the embodiment of the foregoing description but differs from the construction of spindle motor 3 shown in FIGS. 3*a* and 3*b* in that a plurality of spline grooves 12 are provided on the insertion surface of hub 7, and film 11*a* in the form of strips is inserted into each groove 12.

The depth of these grooves 12 is slightly less than the thickness of film 11*a* such that hub 7 and bearings 8*a* and 8*b* do not come into direct contact during insertion when hub 7 and bearings 8*a* and 8*b* are secured by a bonding method. Bonding and fixing is then effected at other surfaces where film 11*a* is not present. After inserting bearings 8*a* and 8*b*, film 11*a* may be removed or left as is.

In cases in which hub 7 and bearings 8*a* and 8*b* are secured by press fitting, the thickness of film 11*a* is set to reduce surface pressure between hub 7 and bearings 8*a* and 8*b* to the extent that galling does not occur during insertion. In this case, the force of friction required for fixing depends only on the force of direct friction between hub 7 and bearings 8*a* and 8*b*, and film 11*a* may therefore be removed following completion of press fitting, as in the case for a bonding method.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A spindle structure of a magnetic disk device comprising:

a hub on which is mounted a magnetic recording medium;

a fixed spindle shaft;

bearings which are secured to said fixed spindle shaft and which rotatably support said hub; and a film of synthetic resin baked onto at least one of a contacting surface of said hub where said hub contacts corresponding contacting surfaces of said bearings and the corresponding contacting surfaces of said bearings, said film protecting the contacting surfaces of said hub and bearings from galling during an assembly of said bearings into said hub.

2. A spindle structure of a magnetic disk device comprising:

a hub on which is mounted a magnetic recording medium;

a fixed spindle shaft; and bearings which are secured to said fixed spindle shaft and which rotatably support said hub; wherein a contacting surface of said hub which contacts said bearings includes a plurality of grooves into which film of a synthetic resin in strip form is inserted for protecting the contacting surface of said hub and bearings from galling during an assembly of said bearings into said hub, said grooves having a depth that is less than a thickness of said film.

* * * * *